United States Patent [19]

Murata et al.

[11] Patent Number: 4,844,445
[45] Date of Patent: Jul. 4, 1989

[54] AUTOMATIC DOCUMENT TRANSPORTATION DEVICE

[75] Inventors: Mitsuhiro Murata, Nara; Naofumi Okada, Tenri; Kazutoshi Yamamoto, Nara; Takuharu Tanimoto, Hiroshima; Tokuyasu Inoue, Hiroshima, all of Japan

[73] Assignee: Sharp Kabushiki Kaisha, Osaka, Japan

[21] Appl. No.: 160,138

[22] Filed: Feb. 25, 1988

[30] Foreign Application Priority Data

Feb. 26, 1987 [JP] Japan ................................. 62-46149

[51] Int. Cl.⁴ .............................................. B65H 5/02
[52] U.S. Cl. .................................... 271/275; 271/198; 355/75
[58] Field of Search ............. 271/7, 34, 275, 198–199; 355/75, 76

[56] References Cited

U.S. PATENT DOCUMENTS 4,620,782 11/1986 Kurando et al. .................... 271/275

FOREIGN PATENT DOCUMENTS

| 68858 | 4/1982 | Japan | 355/75 |
| 159182 | 9/1984 | Japan | 355/75 |
| 226433 | 10/1986 | Japan | 271/275 |
| 229743 | 10/1986 | Japan | 271/275 |

Primary Examiner—H. Grant Skaggs
Attorney, Agent, or Firm—Flehr, Hohbach, Test, Albritton & Herbert

[57] ABSTRACT

An automatic document transportation device is attached to a copier and can be opened and closed with respect to its document table. Its various components for transporting a document sheet to and from the document table are supported by plates which are directly attached to a flexible outer housing piece. Rollers for a conveyor belt for transporting a document sheet has collar-like pieces directly attached to their axes such that a fixed distance can be maintained between the conveyer belt and the document table.

8 Claims, 3 Drawing Sheets

FIG.—1

AUTOMATIC DOCUMENT TRANSPORTATION DEVICE

BACKGROUND OF THE INVENTION

This invention relates to an automatic document transportation device for a copier and the like for transporting an original document sheet to its scanning position to have its printed surface optically scanned and to a discharge location after it is scanned. More particularly, the present invention relates to a mechanism in such a device by which a document table at the scanning position can be maintained at a fixed distance from a conveyer belt for transporting document sheets.

An automatic document transportation device is typically provided opposite to a document table (for example, of a transparent glass material) of a copier and serves to automatically transport an original to be copied onto the table and discharge it after it has been processed. In general, many document sheets are stacked on top of a document supply table and they are transported onto the table one sheet at a time in response to a control command from the copier. After each sheet is moved to the scanning position and optically scanned, it is discharged into a discharge tray and the next sheet on the supply table is transported onto the table. An automatic document transportation device of the type described above is generally provided with a conveyer belt disposed opposite to the document table for transporting the document to the designated scanning position on the table. With any automatic document transportation device of this type, it is extremely important to accurately position an incoming document sheet on the document table because the position of the original document sheet affects the quality of the produced copies. Accordingly, it is important to maintain a fixed distance between the document table and the conveyer belt. If this distance ceases to be uniform, the coefficients of friction between the belt and the document sheet and between the document sheet and the document table become different and the document sheet may come to be transported obliquely to the direction of its motion. It then becomes impossible to deliver a document sheet accurately to the scanning position. Prior art methods of maintaining a fixed distance between them included providing spacers to the four corners of the frame of the document transportation device opposite to the main body of the copier.

An automatic document transportation device is usually built with a strong supporting structure as a combination of frames and stays. Various components of the device such as a document transportation unit, a driving unit for driving the document transportation unit and a control unit for controlling the operation of the driving unit are attached to this structure and an outer housing is also attached to this supporting structure to cover these components. In other words, a conventional automatic document transportation device has a strong supporting structure as its main body to which many of its components as well as its outer cover are attached. Since these frames, stays, components and outer housing pieces are mass-produced, errors are inevitable in their measurements and when they are assembled together, a shearing strain is accordingly unavoidable. Since the magnitude of such a strain varies from one completed assembly to another, the common practice has been to adjust the automatic document transportation devices individually as they are attached to the main bodies of copiers. Such adjustments are extremely time-consuming. In particular, the aforementioned distance between the document table and the conveyer belt would not be adjustable if the document transportation unit were strained. Thus, the adjustments are effected only after the strain in the device is eliminated.

SUMMARY OF THE INVENTION

It is therefore an object of the present invention to provide an automatic document transportation device which is so structured that the separation between its conveyer belt and the document table on which it is placed can be dependably adjusted to be constant independently of the condition of a shearing strain in the device.

An automatic document transportation device according to the present invention, with which the above and other objects of the present invention are achieved, is characterized as having its outer housing piece serving as its main supporting structure. The document transportation unit, the driving unit, the control unit, etc. are attached to this outer housing piece for overall flexibility. The rotary axes of the rollers for supporting and rotating the conveyer belt are provided with collar-like pieces for maintaining a fixed distance between the belt and the document table. This distance is kept constant by causing these collar-like pieces to be pressed against the document table or other parts of the copier. With an automatic document transportation device thus structured, the distance between the belt and the document table can dependably be kept constant even if the device has a shearing strain because these collar-like pieces provided on the axes of the rollers for driving the belt are pressed against the document table by the weight of the device itself.

BRIEF DESCRIPTION OF THE DRAWINGS

The accompanying drawings which are incorporated in and form a part of the specification, illustrate an embodiment of the present invention and, together with the description, serve to explain the principles of the invention. In the drawings.

DETAILED DESCRIPTION OF THE INVENTION

Figure 1:
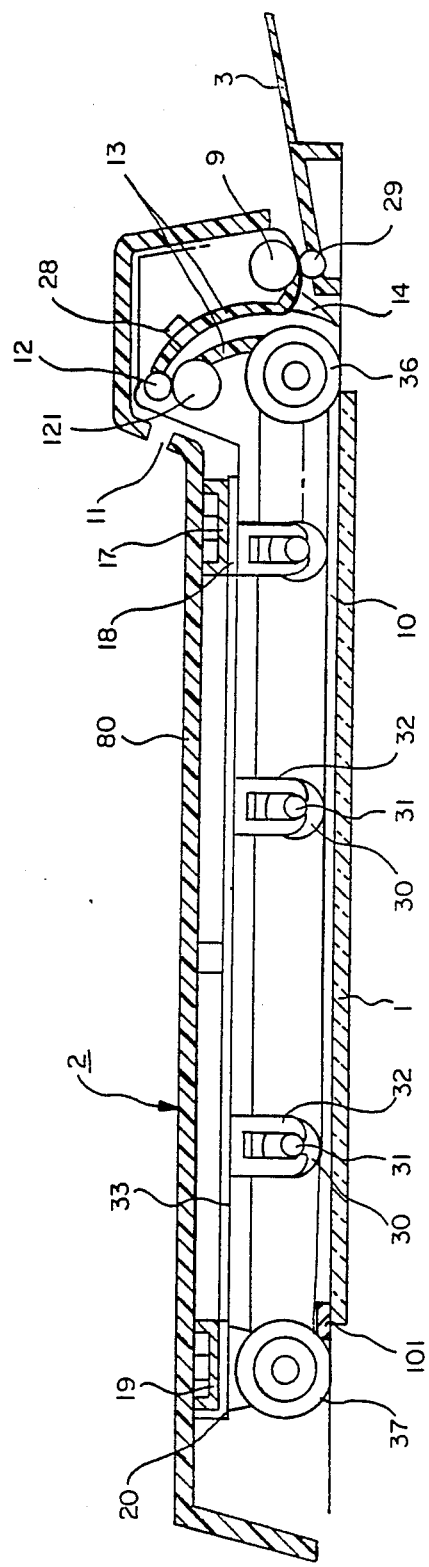
FIG. 1 is a sectional view showing the overall structure of an automatic document transportation device embodying the present invention.
Figure 2:
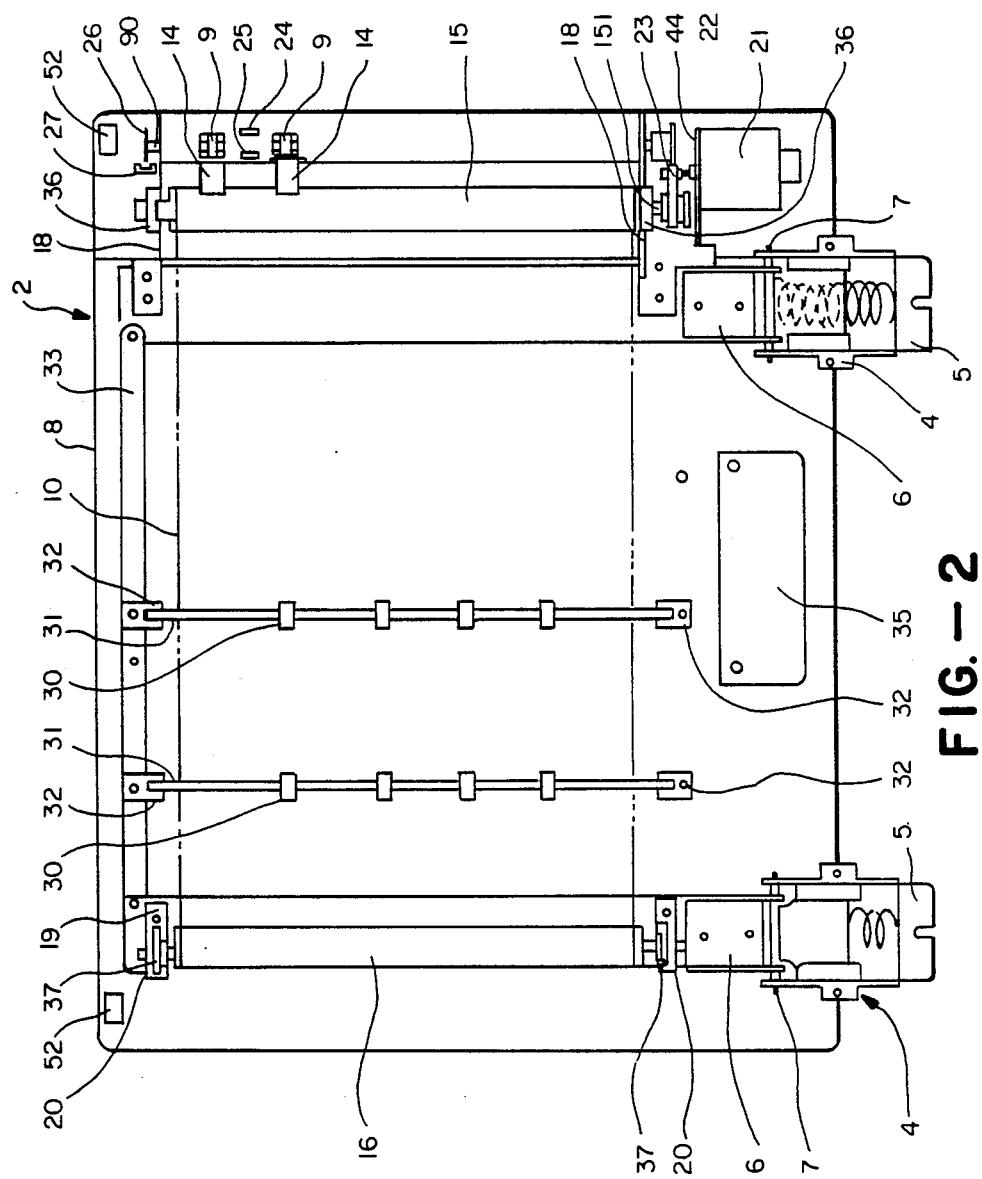
FIG. 2 is a plan view of the document transportation device of FIG. 1 seen from inside when it is opened with respect to the housing of a copier of which it is a part.

With reference to FIGS. 1 and 2 illustrating an automatic document transportation device embodying the present invention, numeral 1 indicates a document table made of a transparent glass which is provided at the top part of the housing of a copier and is adapted to have a document sheet to be placed thereon, numeral 2 indicates a main body of the document transporting device which can be opened and closed with respect to the document table 1, and numeral 3 indicates a document supply table on which document sheets are stacked and from which the stacked document sheets are fed to the document transportation device one sheet at a time. This document supply table 3 is affixed to an elevated part of the copier housing and is not adapted to open or close with the main body 2 of the document transportation device. A stopper 101 is provided at one end of the document table 1 to limit the motion of an incoming document sheet, serving as a reference position for its front edge.

Hinge mechanisms 4 are provided on a side edge of the main body 2 such that parts 5 which are fastened to the copier and parts 6 which are fastened to the main body 2 of the document transportation device are connected rotatably with respect to each other around axes 7 such that the document transportation device can be opened and closed around these axes 7. The main body 2 further contains within its outer housing piece 8 document feeding rollers 9, an endless conveyer belt 10 for transporting document sheets one at a time onto the table discharge rollers 12 and 121 for discharging a document sheet through a discharge outlet 11 onto a discharge tray 80 formed on top of the housing piece 8, a discharge guide piece 13 for leading the document sheet to these discharge rollers 12 and 121 and route switching guide pieces 14 for directing the document sheet towards the discharge guide piece 13 when the document sheet is intended to be discharged. The outlet 11 is formed by removing a portion of the housing piece 8.

The conveyer belt 10 is stretched between conveyer rollers 15 and 16 disposed opposite to edge parts of the document table 1 and is driven by the roller 15. The driving roller 15 is supported rotatably through bearings by frames 18 each affixed at one end to a supporting plate 17 attached directly to the housing piece 8. Similarly, the other conveyer roller 16 is supported rotatably through bearings by supporting members 20 affixed to another supporting plate 19 attached directly to the housing piece 8 parallel to the aforementioned supporting plate 17. One end of the axis 15 of the driving roller 15 penetrates the frame 18 which supports it and is connected to a pulley 22 through which the motive force of a motor (such as a DC motor) 21 is communicated. A driving belt 23 is stretched between a driver pulley on the shaft of this motor 21 and the aforementioned pulley 22 to communicate the rotary power of the motor 21 to the driving roller 15.

The aforementioned frames 18 also support the discharge roller 12 rotatably through bearings or the like, and the rotary power of the motor 21 is also communicated to the other discharge roller 121. They are so adjusted that a document sheet is discharged by the discharge rollers 12 and 121 at nearly the same speed as the speed at which it is transported by the conveyer belt 10. In addition to the discharge roller 12, the axes of the document feeding rollers 9, the discharge guide piece 13, etc. are also attached to the frames 18 to form a single unit. The document feeding rollers 9 are driven independently of the conveyer belt 10, having a separate motor (not shown) such as a DC motor provided to communicate its rotary power to their axes.

Near the document supplying rollers 9 and sandwiched therebetween are document detectors 24 and 25 for detecting a document moving from the document supply table 3. These detectors 24 and 25 may be optical sensors comprised of a light emitting element and a light receiving element. When the first document detector 24 detects the front edge of an incoming document, the document feeding rollers 9 are driven to send the document to the conveyer belt 10. When the second document detector 25 detects the document being thus transported, the feeding rollers 9 are stopped and the document is caused to temporarily wait at this position. The feeding rollers 9 have a shaft 90 with one end protruding from the frame 18 which supports it. Attached to this protruding end of the shaft 90 is a clock disk 26 with slits formed at equal intervals for detecting the length of the document. An optical sensor 27 with a light emitting element and a light receiving element sandwiches this clock disk 26 and measures the length of the document which moves past the document feeding rollers 9 by counting the slit signal (clock pulse) outputted from this optical sensor.

The guide pieces 14 provided between the document feeding rollers 9 and the conveyer belt 10 are rotatably supported such that they normally rotate in the counterclockwise direction with reference to FIG. 1 by their own weight. They can be moved in the clockwise direction by a document sheet transported from the document supply table 3 by the document feeding rollers 9. Thus, an incoming document sheet can pass under the pieces 14 to the document table 1 but when it moves backwards on the document table 1 after it is processed, its front edge is deflected into the discharge route defined by the discharge guide piece 13. A detector 28 similar to those (24 and 25) between the document feeding rollers 9 is provided in the discharge route near the discharge roller 12. When a processed document to be discharged is detected by this detector, a detection signal is transmitted to a control circuit (not shown) which thereupon drives the discharge roller 12 according to the length of the document sheet measured earlier. For example, the discharge roller 12 may be decelerated when the back edge of the document sheet is about 40 mm from the position of the discharge roller 12 and the driving force therefor may be switched off when the back edge is about 10 mm from the discharge roller 12.

The roller 15 for driving the conveyer belt 10, the document feeding rollers 9, the document discharge roller 12, the discharge guide piece 13, the guide pieces 14, the motor 21 and the detectors 24, 25 and 28 are unistructurally formed and attached to the frames 18. A contact roller 29 in contact with the document feeding rollers 9 is rotatably supported by the document supply table 3. As shown in FIG. 1, auxiliary rollers 30 are disposed at appropriate intervals inside the belt 10 such that the document sheet can be transported on the document table effectively without slipping. The ends of the shafts 31 of the auxiliary rollers 30 are supported by supporting members 32 such that the shafts 31 are not only rotatable but also movable vertically. When the automatic document transportation device is closed as shown in FIG. 1, therefore, the rollers 30 move downward by gravity and press the conveyer belt 10 downward against the surface of the document table 1. As shown in FIG. 2, the supporting members 32 on one side of the shafts 31 are affixed to a stay 33 connecting the supporting plates 17 and 19 and those on the other side are directly affixed to the housing piece 8. In FIG. 2, numeral 35 indicates a base board for the control circuit for controlling the overall operation of the document transportation device, operating the motor 21 in response to a command signal from the copier main body, for example, and outputting a signal back to the copier main body. Numerals 36 and 37 indicate collar-like pieces which are affixed to bearings on the axes 151 and 161 of the rollers 15 and 16, respectively, to keep a fixed distance between the conveyer belt 10 and the document table 1.

Figure 3:
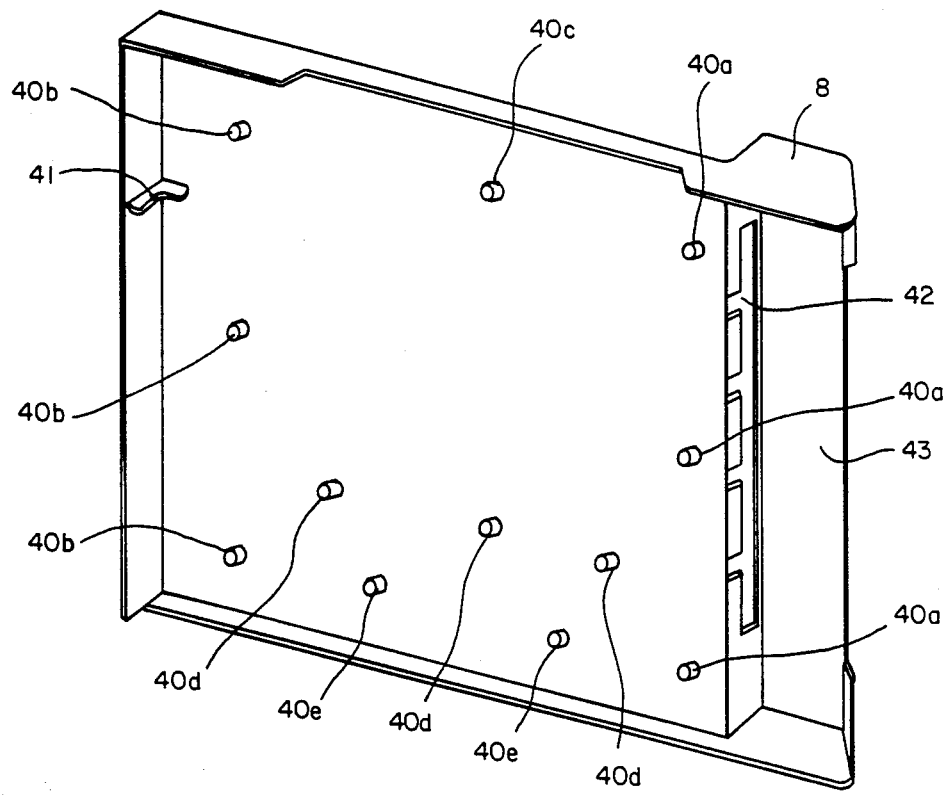
FIG. 3 is a diagonal view of the outer housing piece of the document transportation device.

Next, the manners in which various components of the document transportation device are attached to the outer housing piece 8 are described. The housing piece 8 which embodies the present invention may be of a plastic material such as ABS resin and, as shown in FIG. 3, a large number of protrusions 40 are unistructurally formed thereon for positioning and securing the supporting members 32 for supporting one side of the shafts 31, the supporting plates 17 and 19, the stay 33, the base board of the control circuit, etc. Female screws may be provided to some of these protrusions 40 for securing the supporting plates 17 and 19, etc. The base board 35 may be affixed directly to the housing piece 8 by tapping screws.

In FIG. 3, numeral 41 indicates a rib which is also unistructurally formed with the housing piece 8 for the purpose of reinforcement. Although only one rib 41 is shown in FIG. 3, any number of them may be provided at appropriate locations. Numeral 42 indicates an opening serving as the outlet 11 through which processed document sheets are discharged. Numeral 43 indicates an indented section of the housing piece 8 for containing an assembly comprised of the drive roller 15, the discharge roller 12, the paper feeding rollers 9, etc. supported by the frames 18.

Figure 4:
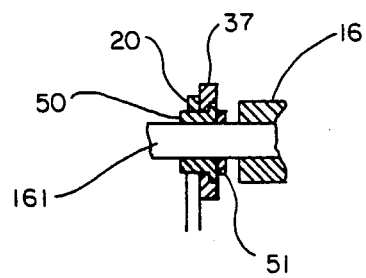
FIG. 4 is a sectional view showing the attachment of the collar-like piece to the roller axis.

The supporting plate 17 is positioned by the protrusions 40a and secured by screws. The supporting plate 19 is positioned by the protrusions 40b and secured by screws. The stay 33 is secured to the plates 17 and 19 by screws at both ends and its center is positioned and secured by the protrusion 40c. The supporting members 20 for rotatably supporting the roller 16 are affixed to the supporting plate 19 by screws and support the ends of the axis 161 of the roller 16 through supporting members 50 as shown in FIG. 4. Attached to each supporting member 50 at one end of the axis 161 is the collar-like piece 37 which, as explained above, serves to keep a fixed distance between the conveyer belt 10 and the document table 1. This distance is usually adjusted to about 0.2-1.5mm. In FIG. 4, numeral 51 indicates an E-ring for preventing the axis 161 from disengaging and falling off.

Secured to the supporting plate 17 by screws are the frames 18 supporting the document feeding rollers 9, the drive roller 15, etc. The drive roller 15 is rotatably supported by the frames 18 as the roller 16 shown in FIG. 4, that is, the collar-like pieces 36 are attached to the axis 151 of the drive roller 15. These collar-like pieces 36 also serve to keep the conveyer belt 10 at the fixed distance from the document table 1. The parts 6 and 7 of the hinge mechanisms 4 briefly described above are respectively attached by screws to end parts of the supporting plates 17 and 19. The motor 21 is secured to one of the frames 18 through an angle 44.

The supporting members 32 for the shafts 31 are affixed to the stay 33 on one side and positioned and secured by the protrusions 40d of the housing piece 8 on the other. For convenience, FIG. 2 does not show every protrusion 40d securing a supporting member 32. The protrusions 40e are provided for securing the base board 35 of the control circuit. Screws are used to secure the base board 35 directly to the outer housing piece 8.

Operation of the automatic document transportation device thus structured and the motion of a document sheet transported therethrough are explained next in detail. When a document sheet to be copied is inserted along the document supply table 3 and its front edge is detected by the detector 24, the document feeding rollers 9 are activated and the document sheet is transported between the document feeding rollers 9 and contact rollers 29 in contact therewith. When the document sheet is thereafter detected by the next detector 25, the motive force on the feeding rollers 9 is switched off and the sheet waits at this position. When a signal indicative of the wait condition of the document sheet is transmitted to the main body of the copier, the copier begins to get ready for a copying operation. If a copy switch on the main body or a start switch on the document transportation device is operated thereafter, a command signal is transmitted from the copier main body to start the transportation of the document sheet, causing the document feeding rollers 9 and the conveyer belt 10 to start moving simultaneously by activating the motor (not shown) for driving the document feeding rollers 9 and the motor 21 for driving the conveyer belt 10.

While the document sheet is thus transported, its length is measured by counting the clock signal generated by the clock disk 26 attached to the shaft 90 of the feeding rollers 9 until the back edge of the sheet passes the position of the detector 24. The number thus counted is multiplied by the distance traveled by the document sheet during one pulse period and the distance between the detectors 24 and 25 is added to this product to obtain the desired length. The measured length is temporarily stored in a memory device (not shown) on the base board 35 of the control circuit. When the back edge of the incoming document sheet is detected by the detector 25, the force driving the document feeding rollers 9 is switched off and the document sheet is thereafter transported on the document table 1 by the conveyer belt 10. In the meantime, the document feeding rollers 9 get ready to bring the next sheet into the aforementioned wait condition.

The conveyer belt 10 is adapted to transport a document sheet at a speed, for example, of about 800–1000 mm/sec.

When the front edge of the sheet being transported by the conveyer belt 10 comes within about 60 mm of the stopper 101, the output to the motor 21 is lowered and the speed of the conveyer belt 10 is reduced to about $\frac{1}{2}$-$\frac{1}{4}$ (or about 300 mm/sec). The speed of the conveyer belt 10 should be reduced as much as possible but the load for its operation increases and it may become impossible to accurately control the speed of the motor 21. After the front edge of the document sheet touches the stopper 101, the motor 21 is run for an extra period of time sufficient for moving the conveyer belt 10 by about 10 mm. This is done in part for the purpose of correcting the orientation of the document sheet which may have become disoriented and in part in view of the possibility that the front edge of the document sheet failed to reach the stopper 101 because of the inertial forces of various components. After the document sheet is thus correctly transported to the designated scanning position, a signal indicative of its correct positioning is transmitted to the copier main body and the standard copying operation is started.

After a desired number of copies are made, or after the optical scanning of the document sheet is completed, a command signal is transmitted to the transportation device 2 to discharge the document sheet on the document table 1. The motor 21 is thereupon rotated in the reverse direction and the document sheet is moved backward, what was its back edge now becoming its front edge. The speed of this backward motion is set to be about the same as that of the forward motion of the sheet to the scanning position. The backward-moving document sheet is deflected by the guide pieces 14 as explained above towards the discharge rollers 12 and 121.

The document sheet deflected into the discharge route is sandwiched between the discharge rollers 12 and 121 and discharged onto the discharge tray 80 formed above the outer housing piece 8. As the sheet moving in the discharge route is detected by the detector 28, the speed of its motion controlled by the discharge rollers 12 and 121 is reduced to $\frac{1}{2}-\frac{1}{4}$(about 40 mm) before the back edge of the sheet passes the position of the detector 28. The measured length of the sheet stored in the memory device is used for this control. The motor 22 is temporarily stopped, for example, for about 100 msec when the edge of the sheet comes within about 10 mm of the detector 28, causing the discharge rollers 12 and 121 to stop and hence the sheet sandwiched therebetween to also stop temporarily. After this short period of time, the operation of the motor 21 is restarted and the discharge of the document sheet is resumed at about $\frac{1}{2}-\frac{1}{4}$ of the normal speed. Since the front edge of the sheet being discharged drops by it own weight when the sheet is temporarily stopped while being sandwiched between the discharge rollers 12 and 121, and since the sheet is transported onto the discharge tray 80 at a reduced speed, the sheet being discharged is not scattered uncontrollably but the discharge operation can be accomplished efficiently and in an orderly manner. In other words, the discharged sheets can be neatly stacked on the discharge tray 80. When a processed sheet is discharged, the next sheet, if at the aforementioned wait position, is transported to the scanning position as explained above.

In summary, the outer housing piece 8 of the present invention remains flexible because the supporting plates 17 and 19, etc. supporting the various components are directly attached to it such that its shearing strain can be corrected easily and its attachment to the main body of a copier becomes much simplified because there is no need for a cumbersome adjustment process. Since the number of components to be contained in the outer housing piece 8 is significantly reduced, in particular, its assembly and disassembly become easier. Both the overall weight and cost of the device are also reduced.

Moreover, when the document transportation device 2 of the present invention is closed to cover the document table on top of the copier as shown in FIG. 1, the collar-like pieces 36 and 37 are sure to come into contact with the document table 1 or other top parts of the copier because of the weight of the device itself even if it is in a strained condition. This is in part because the outer housing piece 8 is flexible and the positional relationship between the conveyer rollers 15 and 16 and the document table 1 is determined by these collar-like pieces 36 and 37. Since these pieces 36 and 37 are directly attached to the axes 151 and 161 of these rollers 15 and 16, they also serve directly to maintain a fixed distance between the conveyer belt 10 and the document table 1. This distance can be much more dependably maintained nearly independently of errors in measurements than by spacers and the like which used to be relied upon conventionally. In FIG. 2, numerals 52 indicate magnets, disposed on the opposite side of the document transportation device 2 from the hinge mechanisms 4. They serve to make the contacts between the collar-like pieces 36 and 37 and the document table 1 even more reliable by the magnetic attraction to the main body of the copier when the device is closed.

In summary, an automatic document transportation device of the present invention is characterized as having pieces which reliably contact the main body of the copier to maintain a fixed distance between its conveyer belt and the document table such that document sheets are evenly transported therein to a desired position.

What is claimed is:

1. In an automatic document transportation device for automatically transporting a document sheet for an optical scanning to a document table on a copier main body and thereafter to a discharge location, said document transportation device being adapted to open and close with respect to said document table, the improvement wherein said automatic document transportation device comprises an outer housing piece which covers said automatic document transportation device from outside, said outer housing piece having attached means for positioning and securing a component formed thereon, supporting means for supporting document transporting means for transporting and discharging a document sheet and driving means for driving said document transporting means, said document transporting means including a conveyer belt and two principal conveyer rollers disposed on mutually opposite sides of said document table for supportingly stretching said conveyer belt therebetween and driving said conveyer belt therearound, said supporting means being directly secured to said attaching means, and interval-maintaining means attached directly to and rotatably around the axes of said principal conveyer rollers for contacting said document table or said copier main body when said document transporting device is closed with respect to said document table to maintain a constant distance between said document table and said conveyer belt.

2. The automatic document transportation device of claim 1 wherein said attaching means comprise protrusions unistructurally formed on a surface of said outer housing piece for positioning and securing a component thereby.

3. The automatic transportation device of claim 1 wherein said outer housing piece comprises a flexible resin material.

4. The automatic document transportation device of claim 1 wherein said outer housing piece includes ribs unistructurally formed therewith for reinforcement.

5. The automatic document transportation device of claim 1 wherein said interval-maintaining means are collar-like pieces.

6. The automatic document transportation device of claim 1 further comprising auxiliary rollers disposed between said two principal conveyer rollers and inside and in contact with said conveyer belt for effectively transporting said document sheet on said document table without slipping.

7. The automatic document transportation device of claim 6 wherein said auxiliary rollers are disposed substantially at equal intervals between said two principal conveyer rollers.

8. The automatic document transportation device of claim 6 wherein said auxiliary rollers are supported by said supporting means.

* * * * *

UNITED STATES PATENT AND TRADEMARK OFFICE
CERTIFICATE OF CORRECTION

PATENT NO. : 4,844,445
DATED : July 4, 1989
INVENTOR(S) : Murata et al.

It is certified that error appears in the above—identified patent and that said Letters Patent is hereby corrected as shown below:

col. 3, ln. 19, after "table", please add --1,--.

col. 3, ln. 39, "15" should read --151--.

col. 4, ln. 50, after "table", please add --1--.

claim 1, ln. 22, "attached" should read --attaching--.

claim 1, ln. 35, "attached directly" should read --directly attached--.

Signed and Sealed this

Eleventh Day of September, 1990

Attest:

HARRY F. MANBECK, JR.

*Attesting Officer*    *Commissioner of Patents and Trademarks*